United States Patent
Tarkiainen et al.

(10) Patent No.: US 10,630,216 B2
(45) Date of Patent: Apr. 21, 2020

(54) ELECTROMECHANICAL POWER TRANSMISSION CHAIN AND AN ELECTRIC SYSTEM, A METHOD, AND A COMPUTER PROGRAM FOR CONTROLLING THE SAME TO STABILIZE CONVERTER INPUT VOLTAGES AND OPTIMIZE COMBUSTION ENGINE EFFICIENCY

(71) Applicant: Visedo Oy, Lappeenranta (FI)

(72) Inventors: Antti Tarkiainen, Lappeenranta (FI); Antti Summanen, Lappeenranta (FI)

(73) Assignee: DANFOSS MOBILE ELECTRIFICATION OY, Lappeenranta (FI)

( * ) Notice: Subject to any disclaimer, the term of this patent is extended or adjusted under 35 U.S.C. 154(b) by 0 days.

(21) Appl. No.: 15/844,691

(22) Filed: Dec. 18, 2017

(65) Prior Publication Data
US 2018/0175763 A1    Jun. 21, 2018

(30) Foreign Application Priority Data
Dec. 21, 2016    (EP) .................................... 16205805

(51) Int. Cl.
*H02P 9/00* (2006.01)
*H02P 17/00* (2006.01)
(Continued)

(52) U.S. Cl.
CPC .............. *H02P 17/00* (2013.01); *B60L 50/13* (2019.02); *B60L 50/15* (2019.02); *B60L 50/16* (2019.02);
(Continued)

(58) Field of Classification Search
CPC .......... B60L 11/08; B60L 11/12; B60L 11/14; B60W 20/00; H02M 3/04; H02P 17/00;
(Continued)

(56) References Cited

U.S. PATENT DOCUMENTS 6,380,715 B1 *  4/2002  Kubo .................... H01M 10/44
                                                        320/128
9,365,117 B2 *  6/2016  Rauma .................... B60L 11/12
(Continued)

FOREIGN PATENT DOCUMENTS

CN      103684004 A     3/2014
CN      103909835 A     7/2014
(Continued)

OTHER PUBLICATIONS

EP Search Report, dated May 24, 2017, from corresponding EP 16 20 5805 application.

*Primary Examiner* — Tulsidas C Patel
*Assistant Examiner* — S. Mikailoff
(74) *Attorney, Agent, or Firm* — Young & Thompson

(57) ABSTRACT

An electric system of an electromechanical power transmission chain is provided that includes a first capacitive circuit, converter equipment between the first capacitive circuit and one or more electric machines, a second capacitive circuit, and a direct voltage converter between the first and second capacitive circuits. The electric system includes a control system for controlling the direct voltage converter in response to changes in first direct voltage of the first capacitive circuit and for controlling the converter equipment in response to changes in second direct voltage of the second capacitive circuit. The control of the first direct voltage is faster than the control of the second direct voltage so as to keep the first direct voltage on a predetermined voltage range and to allow the second direct voltage to fluctuate in order to respond to peak power needs.

8 Claims, 3 Drawing Sheets

(51) Int. Cl.
*H02M 3/04* (2006.01)
*H02P 27/00* (2006.01)
*B60L 50/13* (2019.01)
*B60L 50/16* (2019.01)
*B60L 50/15* (2019.01)

(52) U.S. Cl.
CPC ............... *H02M 3/04* (2013.01); *H02P 9/00* (2013.01); *H02P 27/00* (2013.01); *H02P 2205/03* (2013.01); *Y10S 903/903* (2013.01)

(58) Field of Classification Search
CPC ... H02P 2205/03; H02P 27/00; Y10S 903/903
See application file for complete search history.

(56) References Cited

U.S. PATENT DOCUMENTS

| | | | | |
|---|---|---|---|---|
| 9,475,397 | B2 * | 10/2016 | Tarkiainen | B60L 11/12 |
| 9,685,276 | B2 * | 6/2017 | Jarvelainen | H01G 11/10 |
| 9,708,794 | B2 * | 7/2017 | Rauma | B60K 6/46 |
| 9,802,559 | B2 * | 10/2017 | Naumanen | B60R 16/03 |
| 9,944,272 | B2 * | 4/2018 | Rauma | B60K 6/46 |
| 2014/0163804 | A1 * | 6/2014 | Kaneko | B60K 6/46 701/22 |
| 2014/0195085 | A1 * | 7/2014 | Rauma | B60L 11/12 701/22 |
| 2015/0194273 | A1 * | 7/2015 | Jarvelainen | H01G 11/10 180/54.1 |
| 2015/0210169 | A1 * | 7/2015 | Tarkiainen | B60L 11/12 290/45 |
| 2015/0352961 | A1 | 12/2015 | Kim et al. | |
| 2017/0066332 | A1 * | 3/2017 | Asakawa | H02P 6/04 |
| 2017/0093319 | A1 * | 3/2017 | Oba | B60L 11/04 |
| 2018/0156107 | A1 * | 6/2018 | Naumanen | B60K 6/48 |
| 2018/0175763 | A1 * | 6/2018 | Tarkiainen | B60W 20/00 |
| 2018/0178654 | A1 * | 6/2018 | Nishimura | B60L 3/003 |

FOREIGN PATENT DOCUMENTS

| | | |
|---|---|---|
| CN | 104995357 A | 10/2015 |
| EP | 2 096 747 A2 | 9/2009 |
| EP | 2 602 926 A1 | 6/2013 |
| EP | 2 949 821 A1 | 12/2015 |
| JP | 2002 242234 A | 8/2002 |

* cited by examiner

ELECTROMECHANICAL POWER TRANSMISSION CHAIN AND AN ELECTRIC SYSTEM, A METHOD, AND A COMPUTER PROGRAM FOR CONTROLLING THE SAME TO STABILIZE CONVERTER INPUT VOLTAGES AND OPTIMIZE COMBUSTION ENGINE EFFICIENCY

FIELD OF THE DISCLOSURE

The disclosure relates to an electric system suitable for being a part of an electromechanical power transmission chain. Furthermore, the disclosure relates to a method and to a computer program for controlling an electromechanical power transmission chain.

BACKGROUND

An electromechanical power transmission chain for driving an actuator, e.g. a wheel or a chain track, comprises typically a capacitive circuit, one or more electric machines, and converter equipment for transferring electric energy between the capacitive circuit and the one or more electric machines. The electromechanical power transmission chain can be a series transmission chain where at least one of the electrical machines operates as a generator and the converter equipment comprises one or more converter stages for transferring electric energy from each generator to the capacitive circuit and one or more other converter stages for transferring electric energy from the capacitive circuit to each electric machine which acts as an electric motor for driving an actuator. Each generator can be e.g. an electrically excited synchronous generator or a permanent magnet synchronous generator and the converter stage between the generator and the capacitive circuit can be for example a pulse width modulation "PWM" converter stage. Each electric motor can be e.g. a permanent magnet or induction motor and the converter stage between the capacitive circuit and the electric motor can be e.g. a PWM-converter stage. Each generator can be driven with a combustion engine that can be e.g. a diesel engine, an Otto-cycle engine, or a turbine engine.

An electromechanical power transmission chain can be as well a parallel transmission chain where an electric machine is mechanically connected to a combustion engine and also to an actuator. The electric machine operates sometimes as a generator which charges the capacitive circuit and/or another energy-storage of the electromechanical power transmission chain, and sometimes as an electric motor that receives electric energy from the capacitive circuit and/or the other energy-storage and assists the combustion engine when high mechanical output power is needed. It is also possible that an electromechanical power transmission chain is a combined series-parallel transmission chain so that one or more electric machines are mechanically connected to both a combustion engine and an actuator and one more other electrical machines are arranged to drive one or more other actuators in the same way as in a series transmission chain.

Electromechanical power transmission chains of the kind mentioned above provide advantages compared to a traditional mechanical power transmission chain because, for example, the rotational speed-torque operating point of the combustion engine can be more freely selected from the viewpoint of the operational efficiency of the combustion engine, and thus savings in the fuel costs can be achieved. In many cases, this advantage is achieved so that the above-mentioned capacitive circuit is charged when only low mechanical output power is needed and discharged when high mechanical output power is needed. In other words, the capacitive circuit is used as an energy buffer. The use of the capacitive circuit as an energy buffer is, however, not free from challenges. The electrical energy stored by the capacitive circuit is directly proportional to the square of the voltage of the capacitive circuit, and thus the direct voltage of the capacitive circuit varies when the capacitive circuit acts as an energy buffer. The variation of the direct voltage complicates the control of the electric machines of the electromechanical power transmission chain. Furthermore, in situations where the above-mentioned direct voltage is low, the magnetic fluxes in the electric machines can be so small that the operating efficiencies and maximum torques of the electric machines are decreased.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new electric system that is suitable for being a part of an electromechanical power transmission chain that can be a series transmission chain, a parallel transmission chain, or a combined series-parallel transmission chain.

An electric system according to the invention comprises:
- a first capacitive circuit including at least one first capacitor,
- converter equipment for transferring electric power between the first capacitive circuit and electric machines, the converter equipment being configured to convert a first direct voltage of the first capacitive circuit into voltages of the electric machines,
- a second capacitive circuit including at least one second capacitor,
- a direct voltage converter for transferring electric energy between the first and second capacitive circuits, and
- a control system for controlling the direct voltage converter in response to changes of the first direct voltage to drive the first direct voltage to its reference value, and for controlling the converter equipment in response to changes of a second direct voltage of the second capacitive circuit to drive the second direct voltage to its reference value.

The control system is configured to keep fluctuations of the first direct voltage smaller than fluctuations of the second direct voltage when controlling the direct voltage converter and the converter equipment in response to fluctuation of the electric power transferred between the first capacitive circuit and the electric machines. The converter equipment includes a first converter stage to transfer electric power from a first one of the electric machines acting as a generator to the first capacitive circuit and a second converter stage to transfer electric power from the first capacitive circuit to a second one of the electric machines acting as an electric motor. The control system is configured to determine a power reference for the first one of the electric machines at least partly based on the second direct voltage, and to determine torque and speed references for the first one of the electric machines based on the power reference and pre-stored data expressing a torque-speed operating point for a combustion engine producing mechanical power substantially equal to the power reference.

In an electromechanical power transmission chain comprising the above-described electric system, the second capacitive circuit can be used as an energy buffer for responding to peak power needs whereas the direct voltage of the first capacitive circuit can be kept substantially constant. The substantially constant direct voltage of the first capacitive circuit facilitates the control of the electric machines. Furthermore, as substantial decreases in the direct voltage of the first capacitive circuit can be avoided, the corresponding decreases in the operating efficiencies and in the maximum torques of the electric machines can be avoided too.

In accordance with the invention there is provided also a new electromechanical power transmission chain that can be a series transmission chain or a combined series-parallel transmission chain. An electromechanical power transmission chain according to the invention comprises:

electric machines for receiving mechanical power from a combustion engine and for supplying mechanical power to one or more actuators, e.g., one or more wheels and/or one or more chain tracks, an electric system according to the invention for supplying electric power to each of the electric machines when the electric machine under consideration acts as an electric motor and for receiving electric power from each of the electric machines when the electric machine under consideration acts as a generator.

In accordance with the invention there is provided also a new method for controlling an electromechanical power transmission chain that comprises a first capacitive circuit including at least one first capacitor, electric machines, and converter equipment transferring electric power between the first capacitive circuit and the electric machines, the converter equipment converting a first direct voltage of the first capacitive circuit into voltages of the electric machines. A method according to the invention comprises:

controlling a direct voltage converter to transfer electric energy between the first capacitive circuit and a second capacitive circuit in response to changes of the first direct voltage to drive the first direct voltage to its reference value, the second capacitive circuit including at least one second capacitor, and controlling the converter equipment in response to changes of a second direct voltage of the second capacitive circuit to drive the second direct voltage to its reference value so that fluctuations of the first direct voltage are smaller than fluctuations of the second direct voltage when the direct voltage converter and the converter equipment are controlled in response to fluctuation of the electric power transferred between the first capacitive circuit and the one or more electric machines, wherein:

the electromechanical power transmission chain is a series transmission chain and the converter equipment includes a first converter stage to transfer electric energy from a first one of the electric machines acting as a generator to the first capacitive circuit and a second converter stage to transfer electric energy from the first capacitive circuit to a second one of the electric machines acting as an electric motor, and a power reference is determined for the first one of the electric machines at least partly based on the second direct voltage, and torque and speed references are determined for the first one of the electric machines based on the power reference and pre-stored data expressing a torque-speed operating point for a combustion engine producing mechanical power substantially equal to the power reference.

In accordance with the invention there is provided also a new computer program for controlling an electromechanical power transmission chain that includes a first capacitive circuit including at least one first capacitor, electric machines, and converter equipment to transfer electric power between the first capacitive circuit and the electric machines, the converter equipment being configured to convert a first direct voltage of the first capacitive circuit into voltages of the electric machines, wherein the electromechanical power transmission chain is a series transmission chain in which the converter equipment includes a first converter stage to transfer electric energy from a first one of the electric machines acting as a generator to the first capacitive circuit and a second converter stage to transfer electric energy from the first capacitive circuit to a second one of the electric machines acting as an electric motor. A computer program according to the invention includes computer executable instructions for controlling a programmable processor to:

control a direct voltage converter to transfer electric energy between the first capacitive circuit and a second capacitive circuit in response to changes of the first direct voltage to drive the first direct voltage to its reference value, the second capacitive circuit including at least one second capacitor, control the converter equipment in response to changes of a second direct voltage of the second capacitive circuit to drive the second direct voltage to its reference value so that fluctuations of the first direct voltage are smaller than fluctuations of the second direct voltage when the direct voltage converter and the converter equipment are controlled in response to fluctuation of the electric power transferred between the first capacitive circuit and the one or more electric machines, determine a power reference for the first one of the electric machines at least partly based on the second direct voltage, and determine torque and speed references for the first one of the electric machines based on the power reference and pre-stored data expressing a torque-speed operating point for a combustion engine producing mechanical power substantially equal to the power reference.

A computer program product according to the invention comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
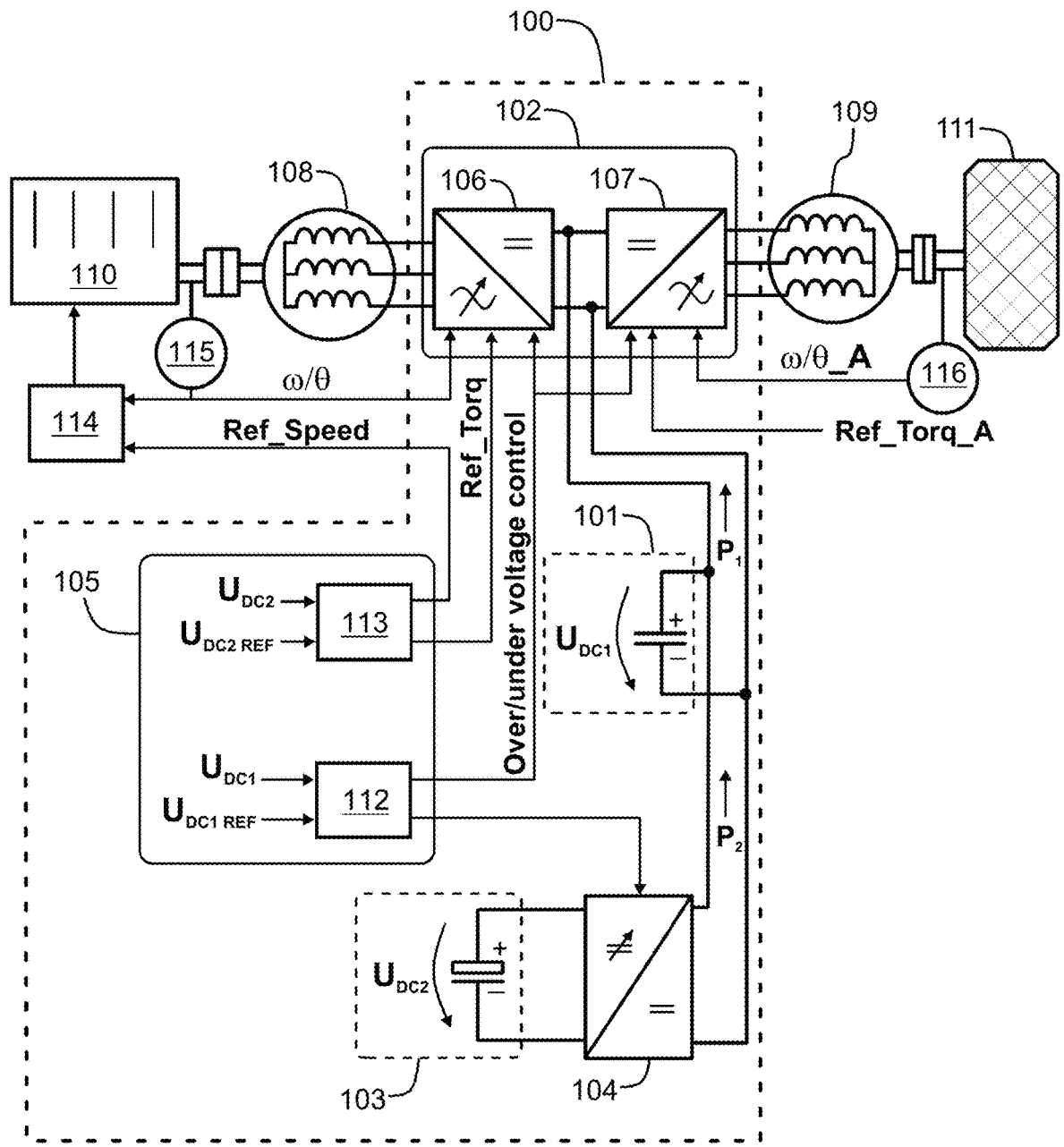
FIG. 1 shows a schematic illustration of an electromechanical power transmission chain that comprises an electric system according to an exemplifying and non-limiting embodiment of the invention.

FIG. 1 shows a schematic illustration of an electromechanical power transmission chain that comprises electric machines 108 and 109 and an electric system 100 according to an exemplifying and non-limiting embodiment of the invention. In this exemplifying case, the electromechanical power transmission chain is a series transmission chain where the electric machine 108 acts as a generator that is driven with a combustion engine 110 and the electric machine 108 acts mainly as an electric motor that drives an actuator 111. The actuator 111 can be for example a wheel or a chain track of e.g. a vehicle or a mobile working machine, a hydraulic pump, or some other device to be driven with mechanical power. The electric machine 109 may temporarily act as a generator during braking actions. The electric system 100 comprises a first capacitive circuit 101 and converter equipment 102 for transferring electric energy between the first capacitive circuit 101 and the electric machines 108 and 109. The converter equipment 102 is configured to convert the direct voltage $U_{DC1}$ of the capacitive circuit 101 into voltages suitable for the electric machines 108 and 109. The electric machine 108 can be for example an electrically excited synchronous machine, a permanent magnet synchronous machine, an asynchronous machine, or a reluctance machine. The electric machine 108 can be an asynchronous machine or a reluctance machine in cases where the converter equipment 102 is capable of supplying reactive power to the electric machine 108, or there are other means for supplying reactive power to the electric machine 108. The electric machine 109 can be for example an electrically excited synchronous machine, a permanent magnet synchronous machine, an asynchronous machine, or a reluctance machine. It is also possible that an electromechanical power transmission chain that comprises an electric system according to an embodiment of the invention comprises one or more direct current "DC" machines.

The electric system 100 comprises a second capacitive circuit 103, and a direct voltage converter 104 for transferring electric energy between the capacitive circuits 101 and 103. The electric system 100 comprises a control system 105 that comprises a first controller 112 for controlling the direct voltage converter 104 in response to changes in the direct voltage $U_{DC1}$ of the capacitive circuit 101. The control system 105 further comprises a second controller 113 for controlling the converter equipment 102 in response to changes in the direct voltage $U_{DC2}$ of the capacitive circuit 103. The controller 112 may comprise for example a proportional and integrative "PI" controller which receives a measured value of the direct voltage $U_{DC1}$ and which tries to keep the direct voltage $U_{DC1}$ at its reference value $U_{DC1\ REF}$ by controlling the operation of the direct voltage converter 104. Correspondingly, the controller 113 may comprise for example a proportional and integrative "PI" controller which receives a measured value of the direct voltage $U_{DC2}$ and which tries to keep the direct voltage $U_{DC2}$ at its reference value $U_{DC2\ REF}$ by controlling the operation of the converter equipment 102. The controllers 112 and 113 are configured so that the controller 112 reacts faster to changes in the direct voltage $U_{DC1}$ than the controller 113 reacts to changes in the direct voltage $U_{DC2}$ so as to keep the direct voltage $U_{DC1}$ on a predetermined voltage range, i.e. near to the reference value $U_{DC1\ REF}$, and to simultaneously allow the direct voltage $U_{DC2}$ to fluctuate in response to fluctuation of electric power transferred between the first capacitive circuit 101 and the electric machines 108 and 109.

In FIG. 1, the electric power transfer between the capacitive circuit 101 and the electric machines 108 and 109 is denoted with $P_1$ that is positive when electric energy flows towards the converter equipment 102. The electric power transfer between the capacitive circuits 101 and 103 is denoted with $P_2$ that is positive when electric energy flows away from the capacitive circuit 103. The direct voltage $U_{DC1}$ of the capacitive circuit 101 remains substantially constant when $P_2$ is substantially $P_1$, i.e. $d(½C_2U_{DC2}^2)/dt = C_2U_{DC2}\ dU_{DC2}/dt = P_1$, where $½C_2U_{DC2}^2$ is the electric energy stored by the capacitive circuit 103 and $C_2$ is the capacitance of the capacitive circuit 103. When the direct voltage converter 104 is controlled to keep the direct voltage $U_{DC1}$ substantially constant, $P_2$ i.e. $d(½C_2U_{DC2}^2)/dt$ is substantially $P_1$ and thus the capacitive circuit 103 is used as an energy buffer for responding to peak power needs of the actuator 111. The substantially constant direct voltage $U_{DC1}$ facilitates the control of the electric machines 108 and 109. Furthermore, as substantial decreases in the direct voltage $U_{DC1}$ can be avoided, the corresponding decreases in the operating efficiencies and in the maximum torques of the electric machines 108 and 109 can be avoided too.

The capacitance $C_2$ of the capacitive circuit 103 that can be used as an energy buffer is advantageously greater than the capacitance of the capacitive circuit 101 whose voltage $U_{DC1}$ is preferably kept substantially constant. The capacitive circuit 103 may comprise for example one or more electric double-layer capacitors "EDLC". In many contexts, an electric double-layer capacitor is called a "super capacitor". The direct voltage converter 104 is a bidirectional converter capable of transferring electric energy to and from the capacitive circuit 103. In cases where the direct voltage $U_{DC1}$ is higher than the direct voltage $U_{DC2}$, the direct voltage converter 104 can be implemented for example with one or more inverter branches of an inverter bridge and with one or more inductor coils so that the direct voltage poles of each inverter branch are connected to the capacitive circuit 101, the alternating voltage pole of each inverter branch is connected via an inductor coil to the positive pole of the capacitive circuit 103, and the negative pole of the capacitive circuit 103 is connected to the negative direct voltage pole of each inverter branch. It is to be however noted that the direct voltage converter 104 can be implemented in many different ways.

In an electric system according to an exemplifying and non-limiting embodiment of the invention, the controller 113 of the control system 105 is configured to react to changes of the direct voltage $U_{DC2}$ slower when the direct voltage $U_{DC2}$ is on a predetermined voltage range than when the direct voltage $U_{DC2}$ is outside the predetermined voltage range. As the controller 113 is configured to be slower when the direct voltage $U_{DC2}$ is on the predetermined voltage range, the electric energy $\frac{1}{2}C_2 U_{DC2}^2$ stored by the capacitive circuit 103 responds effectively to peak power needs of the actuator 111 when the direct voltage $U_{DC2}$ is on the predetermined voltage range. On the other hand, the direct voltage $U_{DC2}$ can be kept sufficiently well in the predetermined voltage range because the controller 113 responds faster when the direct voltage $U_{DC2}$ tends to exit the predetermined voltage range. The controller 113 can be configured to be slower when the direct voltage $U_{DC2}$ is on the predetermined voltage range for example so that the control gain of the controller 113 is smaller when the direct voltage $U_{DC2}$ is on the predetermined voltage range than when the direct voltage $U_{DC2}$ is outside the predetermined voltage range.

In an electric system according to an exemplifying and non-limiting embodiment of the invention, the controller 113 of the control system 105 is configured to control the converter equipment 113 at least partly based on the deviation of the direct voltage $U_{DC2}$ from the reference $U_{DC2\ REF}$, i.e. $U_{DC2} - U_{DC2\ REF}$. The controller 113 is configured to weight the deviation $U_{DC2} - U_{DC2\ REF}$ with a first gain coefficient $G_1$ when the deviation is positive and with a second gain coefficient $G_2$ different from the first gain coefficient when the deviation is negative. The first gain coefficient $G_1$ has a value different from that of the second gain coefficient $G_2$ because the reference $U_{DC2\ REF}$ is typically not in the middle of the allowed range of variation of the direct voltage $U_{DC2}$. The situation where the reference $U_{DC2\ REF}$ is not in the middle of the allowed range of variation of the direct voltage $U_{DC2}$ is present when the reference level of the energy $\frac{1}{2}C_2 U_{DC2\ REF}^2$ is in the middle of the allowed range of variation of the energy. In many cases, it is advantageous that the energy has similar safety margins below and above the reference level of the energy, i.e. the reference level of the energy is in the middle of the allowed range of variation of the energy. In these cases, the safety margin of the direct voltage $U_{DC2}$ above the reference $U_{DC2\ REF}$ is narrower than the safety margin of the direct voltage $U_{DC2}$ below the reference $U_{DC2\ REF}$. This is a corollary of the fact that the energy is not directly proportional to the direct voltage $U_{DC2}$ but, instead, directly proportional to the square of the direct voltage $U_{DC2}$. The first gain coefficient $G_1$ that is used on the narrower safety margin of the $U_{DC2}$, i.e. when the deviation $U_{DC2} - U_{DC2\ REF}$ is positive, has preferably a bigger value than the second gain coefficient $G_2$ that is used on the wider safety margin of the $U_{DC2}$, i.e. when the deviation $U_{DC2} - U_{DC2\ REF}$ is negative. Therefore, in this exemplifying case, the controller 113 is faster to react to changes in the $U_{DC2}$ when the $U_{DC2}$ is above the $U_{DC2\ REF}$ and thereby the changes in the $U_{DC2}$ correspond to stronger changes in the energy $\frac{1}{2}C_2 U_{DC2}^2$ than when the $U_{DC2}$ is below the $U_{DC2\ REF}$ and the changes in $U_{DC2}$ correspond to smaller changes in the energy $\frac{1}{2}C_2 U_{DC2}^2$.

In an electric system according to an exemplifying and non-limiting embodiment of the invention, the controller 112 of the control system 105 is configured to provide over-voltage protection. The controller 112 is configured to control the converter equipment 102 to reduce electric power transfer to the capacitive circuit 101 in response to a situation in which the direct voltage $U_{DC1}$ exceeds a predetermined over-voltage limit. Using the notations shown in FIG. 1, the electric power transfer to the first capacitive circuit 101 is $P_2 - P_1$. Thus, the electric power transfer to the first capacitive circuit 101 can be reduced by controlling the converter equipment 102 to increase the electric power transfer $P_1$. The electric power transfer $P_1$ increases when the electric power taken from the electric machine 108 acting as a generator is decreased and/or the electric power supplied to the electric machine 109 acting as an electric motor is increased. The electric power taken from the electric machine 108 can be decreased by decreasing the torque reference of the electric machine 108.

In an electric system according to an exemplifying and non-limiting embodiment of the invention, the controller 112 of the control system 105 is configured to provide under-voltage protection. The controller 112 is configured to control the converter equipment 102 to reduce the electric power transfer from the capacitive circuit 101 in response to a situation in which the direct voltage $U_{DC1}$ falls below a predetermined under-voltage limit. Using the notations shown in FIG. 1, the electric power transfer from the first capacitive circuit 101 is $P_1 - P_2$. Thus, the electric power transfer from the first capacitive circuit 101 can be reduced by controlling the converter equipment 102 to decrease the electric power transfer $P_1$. The electric power transfer $P_1$ decreases when the electric power taken from the electric machine 108 acting as a generator is increased and/or the electric power supplied to the electric machine 109 acting as an electric motor is decreased. The electric power taken from the electric machine 108 can be increased by increasing the torque reference of the electric machine 108.

In the exemplifying electromechanical power transmission chain illustrated in FIG. 1, the converter equipment 102 comprises a first converter stage 106 for transferring electric energy from the electric machine 108 acting as a generator to the capacitive circuit 101 and a second converter stage 107 for transferring electric energy from the capacitive circuit 101 to the electric machine 109 acting as an electric motor. The converter stages 106 and 107 can be for example pulse width modulation "PWM" converter stages. In the exemplifying case shown in FIG. 1, the actuator 111 is assumed to be driven according to an externally given torque reference Ref_Torq_A. The converter stage 107 is configured to control the torque of the electric machine 109 in accordance with the externally given torque reference Ref_Torq_A. Depending on the required control accuracy, the control of the electric machine 109 can be a scalar control with or without a rotational speed and/or position measurement, or a vector control with or without the rotational speed and/or position measurement. In the exemplifying case shown in FIG. 1, the control of the electric machine 109 comprises a rotational speed and/or position measurement implemented with a rotational speed and/or position sensor 116 that produces a rotational speed and/or position signal ω/θ_A. It is also possible that the actuator 111 is driven according to an externally given rotational speed or position reference.

In an electric system according to an exemplifying and non-limiting embodiment of the invention, the controller 113 of the control system 105 is configured to determine a power reference for the electric machine 108 at least partly on the basis of the direct voltage $U_{DC2}$ so that the power reference is typically increased when the direct voltage $U_{DC2}$ is below its reference $U_{DC2\_REF}$ and the power reference is typically decreased when the direct voltage $U_{DC2}$ is above its reference $U_{DC2\_REF}$. Furthermore, the power reference of the electric machine 108 can be made dependent on the electric power supplied to the electric machine 109. The controller 113 can be further configured to determine torque and rotational speed references Ref_Torq and Ref_Speed for the electric machine 108 on the basis of the above-mentioned power reference and pre-stored data that expresses an advantageous torque-speed operating point for the combustion engine 110 in a situation where the combustion engine 110 produces mechanical power substantially equal to the power reference. The pre-stored data may express for example a torque-speed operating point at which the combustion engine 110 is able to produce the required mechanical power with maximal efficiency, i.e. with minimal losses. For another example, the pre-stored data may express a torque-speed operating point at which the combustion engine 110 is able to produce the required mechanical power with near maximal efficiency, i.e. with near minimal losses, and at which the combustion engine 110 has a sufficient ability to respond changes.

In the exemplifying case shown in FIG. 1, the combustion engine 110 is driven in a rotational speed control mode with the aid of a speed controller 114. The speed controller 114 may control e.g. the fuel and air supply of the combustion engine 110 on the basis of the above-mentioned rotational speed reference Ref_Speed and a rotational speed and/or position signal ω/θ that is produced with a rotational speed and/or position sensor 115. The converter stage 106 is configured to control the torque of the electric machine 108 in accordance with the above-mentioned torque reference Ref_Torq. Depending on the required control accuracy, the control of the electric machine 108 can be a scalar control with or without a rotational speed and/or position measurement, or a vector control with or without the rotational speed and/or position measurement. In the exemplifying case illustrated in FIG. 1, the rotational speed and/or position signal ω/θ is utilized in the control of the electric machine 108. It is also possible that the electric machine 108 is driven in the rotational speed control mode and the combustion engine is driven in the torque control mode.

Figure 2:
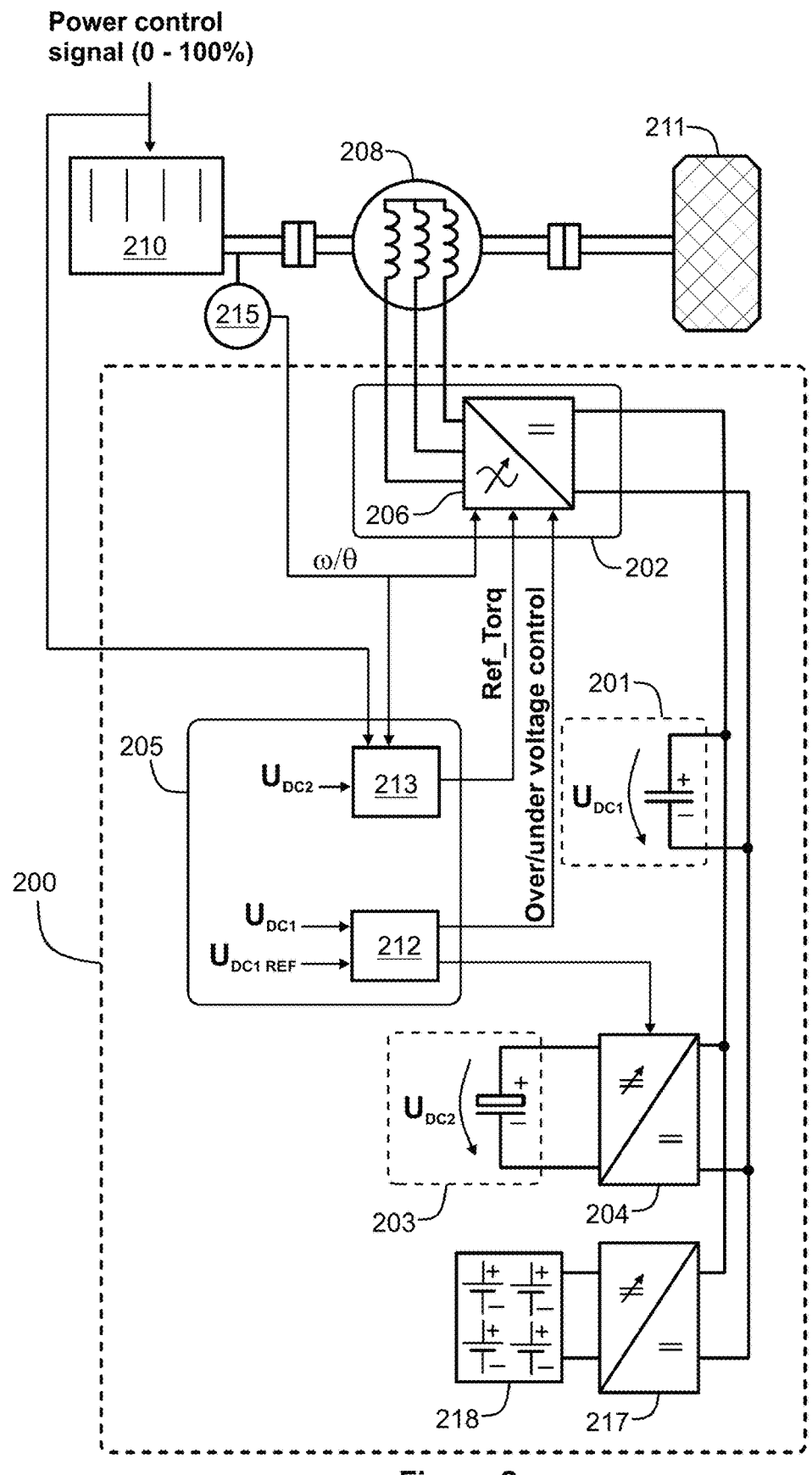
FIG. 2 shows a schematic illustration of an electromechanical power transmission chain that comprises an electric system according to another exemplifying and non-limiting embodiment of the invention.

FIG. 2 shows a schematic illustration of an electromechanical power transmission chain that comprises an electric machine 208 and an electric system 200 according to an exemplifying and non-limiting embodiment of the invention. In this exemplifying case, the electromechanical power transmission chain is a parallel transmission chain where the electric machine 208 and a combustion engine 210 are mechanically connected to each other and both the electric machine 208 and the combustion engine 210 are arranged to supply mechanical power to an actuator 211. The electric machine 208 operates sometimes as a generator which produces electric energy, and sometimes as an electric motor that consumes electric energy and assists the combustion engine 210 when high mechanical output power is needed. The electric system 200 comprises a first capacitive circuit 201 and converter equipment 202 for transferring electric energy between the first capacitive circuit 201 and the electric machine 208. The converter equipment 202 is configured to convert the direct voltage $U_{DC1}$ of the capacitive circuit 201 into voltages suitable for the electric machine 208. The electric system 200 comprises a second capacitive circuit 203 and a direct voltage converter 204 for transferring electric energy between the capacitive circuits 201 and 203. The electric machine 208 can be for example an electrically excited synchronous machine, a permanent magnet synchronous machine, an asynchronous machine, or a reluctance machine. The electric machine 208 can be an asynchronous machine or a reluctance machine in cases where the converter equipment 202 is capable of supplying reactive power to the electric machine 208, or there are other means for supplying reactive power to the electric machine 208. The electric system 200 may further comprise a battery element 218 and a direct voltage converter 217 for charging and discharging the battery element 218.

The electric system 200 comprises a control system 205 that comprises a first controller 212 for controlling the direct voltage converter 204 in response to changes in direct voltage $U_{DC1}$ of the capacitive circuit 201. The control system 205 further comprises a second controller 213 for controlling the converter equipment 202 in response to changes in direct voltage $U_{DC2}$ of the capacitive circuit 203. The controllers 212 and 213 are configured so that the controller 212 reacts faster to changes of the direct voltage $U_{DC1}$ than the controller 213 reacts to changes of the direct voltage $U_{DC2}$ so as to keep the direct voltage $U_{DC1}$ on a predetermined voltage range, i.e. near to a reference value $U_{DC1\_REF}$, and to simultaneously allow the direct voltage $U_{DC2}$ to fluctuate in response to fluctuation of electric power transferred between the capacitive circuit 201 and the electric machine 208.

In the exemplifying electromechanical power transmission chain illustrated in FIG. 2, the converter equipment 202 comprises a converter stage 206 for transferring electric energy from the electric machine 208 to the capacitive circuit 201 when the electric machine acts as a generator, and for transferring electric energy from the capacitive circuit 201 to the electric machine 208 when the electric machine acts an electric motor. The converter stage 206 can be for example a pulse width modulation "PWM" converter stage.

In the exemplifying case shown in FIG. 2, the combustion engine 210 is controlled by an externally given power control signal. The power control signal can determine for example the fuel and air supply of the combustion engine 210. The controller 213 can be configured to determine a torque reference Ref_Torq for the electric machine 208 at least partly on the basis of the direct voltage $U_{DC2}$, the power control signal of the combustion engine 210, and the prevailing or estimated rotational speed of the electric machine 208. In the exemplifying case shown in FIG. 2, the prevailing rotational speed ω is measured with a rotational speed sensor 215. The reference torque Ref_Torq can be determined for example in the following exemplifying way:

Motor power MP and generator power GP for the electric machine 208 are determined as functions of the direct voltage $U_{DC2}$ so that:
  the motor power $MP(U_{DC2})$ is zero when $U_{DC2} \leq$ motor limit voltage $U_M$,
  the motor power $MP(U_{DC2})$ is an increasing function of the $U_{DC2}$ when $U_{DC2} > U_M$,
  the generator power $GP(U_{DC2})$ is zero when $U_{DC2} \geq$ generator limit voltage $U_G$, and
  the generator power $GP(U_{DC2})$ is a decreasing function of the $U_{DC2}$ when $U_{DC2} < U_G$, where $U_G > U_M$ i.e. the voltage area of allowed motor operation of the electric machine 208 and the voltage area of allowed generator operation of the electric machine 208 are partially overlapping.

After an increase in the above-mentioned power control signal of the combustion engine 210, the electric machine 208 is run as an electric motor in the torque control mode so that the Ref_Torq is substantially the motor power $MP(U_{DC2})$ divided by the prevailing rotational speed ω. Thus, in cases where the $U_{DC2}$ is above the motor limit voltage $U_M$, an increase in the power control signal is responded not only by the combustion engine 210 but also by the electric machine 208 depending on the direct voltage $U_{DC2}$. After a decrease in the above-mentioned power control signal, the electric machine 208 is run as a generator in the torque control mode so that the Ref_Torq is substantially the generator power $GP(U_{DC2})$ divided by the prevailing rotational speed ω. Thus, in cases where the $U_{DC2}$ is below the generator limit voltage $U_G$, a decrease in the power control signal is responded not only by the combustion engine 210 but also by the electric machine 208 depending on the direct voltage $U_{DC2}$.

Figure 3:
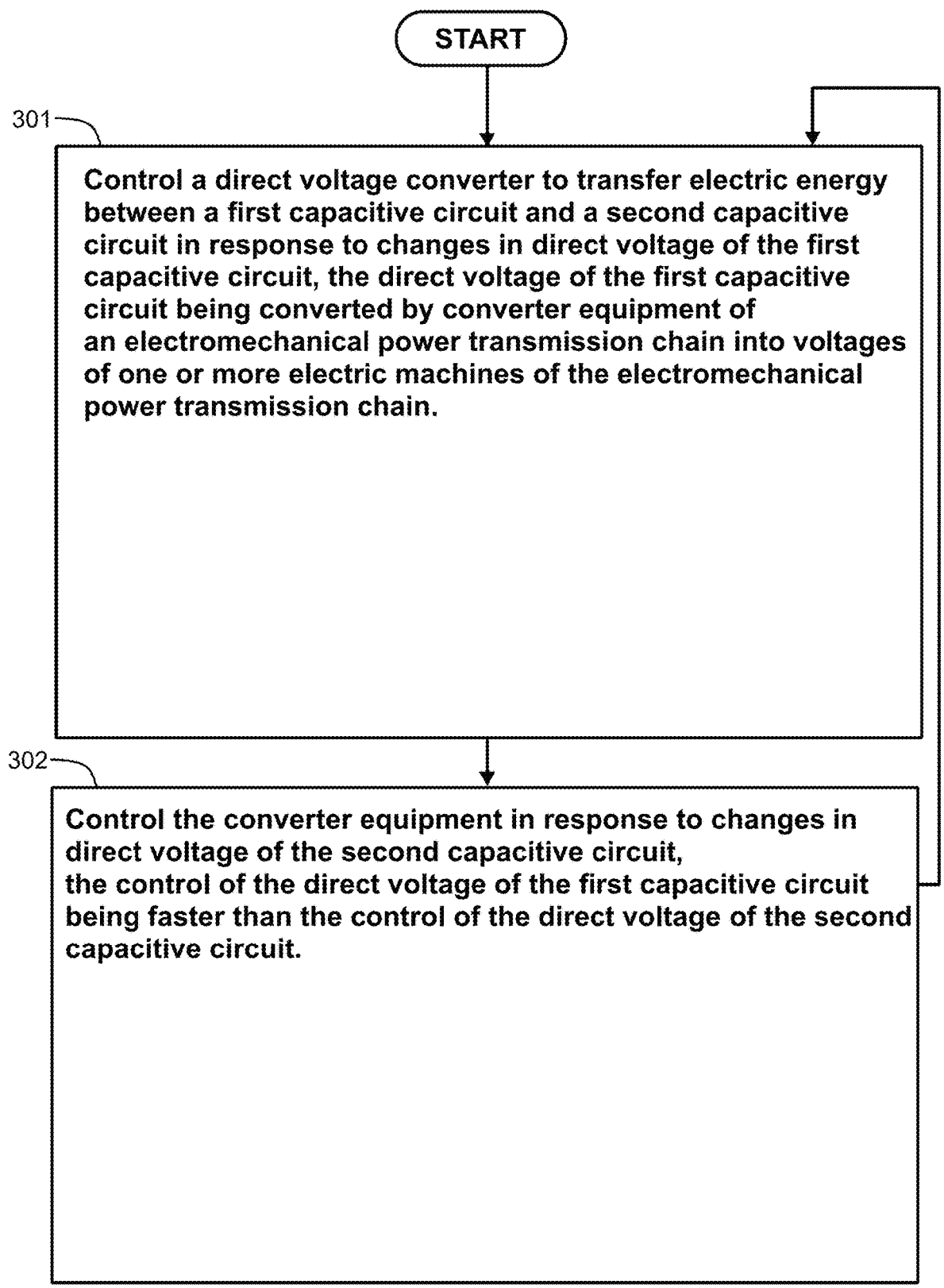
FIG. 3 shows a flowchart of a method according to an exemplifying and non-limiting embodiment of the invention for controlling an electromechanical power transmission chain.

FIG. 3 shows a flowchart of a method according to an exemplifying and non-limiting embodiment of the invention for controlling an electromechanical power transmission chain that comprises a first capacitive circuit, one or more electric machines, and converter equipment transferring electric energy between the first capacitive circuit and the one or more electric machines, the converter equipment converting first direct voltage of the first capacitive circuit into one or more voltages suitable for the one or more electric machines.

The method comprises the following actions:
- action 301: controlling a direct voltage converter to transfer electric energy between the first capacitive circuit and a second capacitive circuit in response to changes of the first direct voltage, and
- action 302: controlling the converter equipment in response to changes of second direct voltage of the second capacitive circuit so that the control of the direct voltage converter is faster to react to the changes of the first direct voltage than the control of the converter equipment is to react to the changes of the second direct voltage so as to keep the first direct voltage on a first predetermined voltage range and to allow the second direct voltage to fluctuate in response to fluctuation of electric power transferred between the first capacitive circuit and the one or more electric machines.

In a method according to an exemplifying and non-limiting embodiment of the invention, the control of the converter equipment reacts slower to changes of the second direct voltage when the second direct voltage is on a second predetermined voltage range than when the second direct voltage is outside the second predetermined voltage range.

In a method according to an exemplifying and non-limiting embodiment of the invention, the control of the converter equipment is at least partly based on a deviation of the second direct voltage from a reference, and the deviation is weighted with a first gain coefficient when the deviation is positive and with a second gain coefficient different from the first gain coefficient when the deviation is negative.

In a method according to an exemplifying and non-limiting embodiment of the invention, the converter equipment is controlled to reduce transfer of electric energy to the first capacitive circuit in response to a situation in which the first direct voltage exceeds a predetermined over-voltage limit.

In a method according to an exemplifying and non-limiting embodiment of the invention, the converter equipment is controlled to reduce transfer of electric energy from the first capacitive circuit in response to a situation in which the first direct voltage falls below a predetermined under-voltage limit.

In a method according to an exemplifying and non-limiting embodiment of the invention, the capacitance of the second capacitive circuit is greater than the capacitance of the first capacitive circuit.

In a method according to an exemplifying and non-limiting embodiment of the invention, the second capacitive circuit comprises at least one electric double-layer capacitor.

In a method according to an exemplifying and non-limiting embodiment of the invention, the electromechanical power transmission chain is a series transmission chain and the converter equipment comprises a first converter stage for transferring electric energy from a first electric machine acting as a generator to the first capacitive circuit and a second converter stage for transferring electric energy from the first capacitive circuit to a second electric machine acting as an electric motor.

In a method according to an exemplifying and non-limiting embodiment of the invention, a power reference is determined for the first electric machine at least partly on the basis of the second direct voltage, and torque and speed references are determined for the first electric machine on the basis of the power reference and pre-stored data expressing a torque-speed operating point for a combustion engine producing mechanical power substantially equal to the power reference.

In a method according to an exemplifying and non-limiting embodiment of the invention, the electromechanical power transmission chain is a parallel transmission chain and the converter equipment comprises a converter stage for transferring electric energy from an electric machine to the first capacitive circuit when the electric machine acts as a generator, and for transferring electric energy from the first capacitive circuit to the electric machine when the electric machine acts an electric motor.

In a method according to an exemplifying and non-limiting embodiment of the invention, a torque reference is determined for the electric machine of the parallel transmission chain at least partly on the basis of the second direct voltage, a power control signal of a combustion engine mechanically connected to the electric machine, and the prevailing rotational speed of the electric machine.

A computer program according to an exemplifying and non-limiting embodiment of the invention for controlling an electromechanical power transmission chain comprises computer executable instructions for controlling a programmable processor to carry out a method according to any of the above-described exemplifying and non-limiting embodiments of the invention.

A computer program according to an exemplifying and non-limiting embodiment of the invention comprises software modules for controlling an electromechanical power transmission chain that comprises a first capacitive circuit, one or more electric machines, and converter equipment for transferring electric energy between the first capacitive circuit and the one or more electric machines, the converter equipment being configured to convert first direct voltage of the first capacitive circuit into one or more voltages suitable for the one or more electric machines.

The software modules comprise computer executable instructions for controlling a programmable processor to:

control a direct voltage converter to transfer electric energy between the first capacitive circuit and a second capacitive circuit in response to changes of the first direct voltage, and control the converter equipment in response to changes of second direct voltage of the second capacitive circuit so that the control of the direct voltage converter is faster to react to the changes of the first direct voltage than the control of the converter equipment is to react to the changes of the second direct voltage so as to keep the first direct voltage on a predetermined voltage range and to allow the second direct voltage to fluctuate in response to fluctuation of electric power transferred between the first capacitive circuit and the one or more electric machines.

The software modules can be for example subroutines and/or functions generated with a suitable programming language.

A computer program product according to an exemplifying and non-limiting embodiment of the invention comprises a non-volatile computer readable medium, e.g. a compact disc "CD", encoded with the above-mentioned software modules.

A signal according to an exemplifying and non-limiting embodiment of the invention is encoded to carry information defining a computer program according to an embodiment of the invention.

The specific examples provided in the description given above should not be construed as limiting the applicability and/or the interpretation of the appended claims. Lists and groups of examples provided in the description given above are not exhaustive unless otherwise explicitly stated.

What is claimed is:

1. An electric system comprising:
a first capacitive circuit comprising at least one first capacitor;
converter equipment configured to transfer electric power between the first capacitive circuit and electric machines, the converter equipment being configured to convert a first direct voltage of the first capacitive circuit into output voltages and to output each of the output voltages to respective ones of the electric machines;
a second capacitive circuit comprising at least one second capacitor;
a direct voltage converter configured to transfer electric energy between the first and the second capacitive circuits; and
a control system configured to control the direct voltage converter in response to changes of the first direct voltage to drive the first direct voltage to a first direct voltage reference value, and to control the converter equipment in response to changes of a second direct voltage of the second capacitive circuit to drive the second direct voltage to a second direct voltage reference value,
wherein the control system is configured to keep fluctuations of the first direct voltage smaller than fluctuations of the second direct voltage when controlling the direct voltage converter and the converter equipment in response to fluctuation of the electric power transferred between the first capacitive circuit and the electric machines,
wherein the converter equipment comprises a first converter stage to transfer electric power from a first one of the electric machines operating as a generator to the first capacitive circuit and a second converter stage to transfer electric power from the first capacitive circuit to a second one of the electric machines operating as an electric motor, and
wherein the control system is configured to determine a power reference for the first one of the electric machines at least partly based on the second direct voltage to drive the second direct voltage to the second direct voltage reference value, and to determine one of a torque reference and a speed reference for the first one of the electric machines based on the power reference and on pre-stored data, the pre-stored data including at least one torque-speed operating point for a combustion engine to produce mechanical power substantially equal to the power reference to control the combustion engine to produce the mechanical power substantially equal to the power reference and to drive one of a torque and a rotational speed of the first one of the electric machines in accordance with the respective one of the torque reference and the speed reference.

2. The electric system according to claim 1, wherein the control system is configured to control the converter equipment to reduce transfer of electric energy to the first capacitive circuit in response to a situation in which the first direct voltage exceeds a predetermined over-voltage limit.

3. The electric system according to claim 1, wherein the control system is configured to control the converter equipment to reduce transfer of electric energy from the first capacitive circuit in response to a situation in which the first direct voltage falls below a predetermined under-voltage limit.

4. The electric system according to claim 1, wherein capacitance of the second capacitive circuit is greater than capacitance of the first capacitive circuit.

5. The electric system according to claim 1, wherein the at least one second capacitor of the second capacitive circuit comprises at least one electric double-layer capacitor.

6. An electromechanical power transmission chain comprising:
electric machines, a first one of the electric machines being configured to receive mechanical power from a combustion engine, a second one of the electric machines being configured to supply mechanical power to one or more actuators, each electric machine being operable as an electric motor or as a generator; and
an electric system configured to supply electrical power to one of the electric machines when the one of the electric machines operates as an electric motor, the electric system being configured to receive electrical power from another of the electric machines when the other of the electric machines operates as a generator, the electric system comprising:
a first capacitive circuit comprising at least one first capacitor,
converter equipment configured to transfer electric power between the first capacitive circuit and the electric machines, the converter equipment being configured to convert a first direct voltage of the first capacitive circuit into output voltages to output each of the output voltages to respective ones of the electric machines,
a second capacitive circuit comprising at least one second capacitor,
a direct voltage converter configured to transfer electric energy between the first and the second capacitive circuits, and
a control system configured to control the direct voltage converter in response to changes of the first direct voltage to drive the first direct voltage to a first direct voltage reference value, and to control the converter equipment in response to changes of a second direct voltage of the second capacitive circuit to drive the second direct voltage to a second direct voltage reference value, the control system being configured to keep fluctuations of the first direct voltage smaller than fluctuations of the second direct voltage when controlling the direct voltage converter and the converter equipment in response to fluctuation of the electric power transferred between the first capacitive circuit and the electric machines, wherein the converter equipment comprises a first converter stage to transfer electric energy from a first one of the electric machines, when the first one of the electric machines is operating as a generator to the first capacitive circuit and a second converter stage to transfer electric energy from the first capacitive circuit to a second one of the electric machines, when the second one of the electric machines is operating as an electric motor, and wherein the control system is configured to determine a power reference for the first one of the electric machines at least partly based on the second direct voltage to drive the second direct voltage to the second direct voltage reference value, and to determine one of a torque reference and a speed reference for the first one of the electric machines based on the power reference and pre-stored data, the pre-stored data including at least one torque-speed operating point for the combustion engine to produce mechanical power substantially equal to the power reference to control the combustion engine to produce the mechanical power substantially equal to the power reference and to drive one of a torque and a rotational speed of the first one of the electric machines in accordance with the respective one of the torque reference and the speed reference.

7. A method for controlling an electromechanical power transmission chain that includes
a first capacitive circuit including at least one first capacitor,
electric machines,
converter equipment configured to transfer electric power between the first capacitive circuit and the electric machines,
a second capacitive circuit including at least one second capacitor, and
a direct voltage converter,
the electromechanical power transmission chain being a series transmission chain in which a first one of the electric machines is connected to and driven by a combustion engine to operate as a generator providing electric energy to a second one of the electric machines that operates as an electric motor,
the converter equipment including
a first converter stage to transfer electric energy from the first one of the electric machines operating as the generator to the first capacitive circuit, and
a second converter stage to transfer electric energy from the first capacitive circuit to the second one of the electric machines operating as the electric motor,
the converter equipment converting a first direct voltage of the first capacitive circuit into output voltages and outputting each of the output voltages to each of the electric machines, the method comprising:
controlling the direct voltage converter to transfer electric energy between the first capacitive circuit and the second capacitive circuit in response to changes of the first direct voltage to drive the first direct voltage to a first direct voltage reference value;
controlling the converter equipment in response to changes of a second direct voltage of the second capacitive circuit to drive the second direct voltage to a second direct voltage reference value; and
determining a power reference for the first one of the electric machines at least partly based on the second direct voltage;
determining one of a torque reference and a speed reference for the first one of the electric machines based on the power reference and on pre-stored data, the pre-stored data including at least one torque-speed operating point for the combustion engine to produce mechanical power substantially equal to the power reference; and
controlling the combustion engine to produce the mechanical power substantially equal to the power reference and to drive one of a torque and a rotational speed of the first one of the electric machines in accordance with the respective one of the torque reference and the speed reference,
wherein fluctuations of the first direct voltage are controlled to be smaller than fluctuations of the second direct voltage when the direct voltage converter and the converter equipment are controlled in response to fluctuation of the electric power transferred between the first capacitive circuit and the electric machines.

8. A non-transitory computer readable medium encoded with a computer program for controlling an electromechanical power transmission chain, the electromechanical power transmission chain including
a first capacitive circuit including at least one first capacitor,
electric machines,
converter equipment configured to transfer electric power between the first capacitive circuit and the electric machines,
a second capacitive circuit including at least one second capacitor, and
a direct voltage converter,
the electromechanical power transmission chain being a series transmission chain in which a first one of the electric machines is connected to and driven by a combustion engine to operate as a generator providing electric energy to a second one of the electric machines that operates as an electric motor,
the converter equipment including
a first converter stage to transfer electric energy from the first one of the electric machines operating as the generator to the first capacitive circuit, and
a second converter stage to transfer electric energy from the first capacitive circuit to the second one of the electric machines operating as the electric motor,
the converter equipment being configured to convert a first direct voltage of the first capacitive circuit into output voltages and to output each of the output voltages to respective ones of the electric machines, the computer program comprising computer executable instructions to control a programmable processor to:
control the direct voltage converter to transfer electric energy between the first capacitive circuit and the second capacitive circuit in response to changes of the first direct voltage to drive the first direct voltage to a first direct voltage reference value;

control the converter equipment in response to changes of a second direct voltage of the second capacitive circuit to drive the second direct voltage to a second direct voltage reference value;

determine a power reference for the first one of the electric machines at least partly based on the second direct voltage;

determine one of a torque reference and a speed reference for the first one of the electric machines based on the power reference and on pre-stored data, the pre-stored data including at least one torque-speed operating point for the combustion engine to produce mechanical power substantially equal to the power reference; and control the combustion engine to produce the mechanical power substantially equal to the power reference and to drive one of a torque and a rotational speed of the first one of the electric machines in accordance with a respective one of the torque reference and the speed reference, wherein fluctuations of the first direct voltage are controlled to be smaller than fluctuations of the second direct voltage when the direct voltage converter and the converter equipment are controlled in response to fluctuation of the electric power transferred between the first capacitive circuit and the electric machines.

* * * * *